(12) United States Patent
Chen

(10) Patent No.: US 9,216,314 B2
(45) Date of Patent: Dec. 22, 2015

(54) HANGING STAND FOR A BARBELL

(71) Applicant: Ya-Chi Chen, New Taipei (TW)

(72) Inventor: Ya-Chi Chen, New Taipei (TW)

(*) Notice: Subject to any disclaimer, the term of this patent is extended or adjusted under 35 U.S.C. 154(b) by 0 days.

(21) Appl. No.: 14/559,292

(22) Filed: Dec. 3, 2014

(65) Prior Publication Data

US 2015/0224358 A1 Aug. 13, 2015

(30) Foreign Application Priority Data

Feb. 10, 2014 (TW) .............................. 103202288 U

(51) Int. Cl.
*A63B 21/00* (2006.01)
*A63B 21/072* (2006.01)
*F16M 13/02* (2006.01)

(52) U.S. Cl.
CPC ............ *A63B 21/072* (2013.01); *F16M 13/027* (2013.01)

(58) Field of Classification Search
USPC ........ 248/323, 327, 333, 276.1, 284.1, 274.1, 248/651, 653, 654, 339, 340, 303; 211/117; 482/104
See application file for complete search history.

(56) References Cited

U.S. PATENT DOCUMENTS

| | | | | | |
|---|---|---|---|---|---|
| 5,346,448 | A | * | 9/1994 | Sollo | 482/104 |
| 5,810,304 | A | * | 9/1998 | Lehrman | 248/215 |
| 7,025,712 | B2 | * | 4/2006 | Parrilla | 482/104 |
| 7,699,756 | B2 | * | 4/2010 | Piane, Jr. | 482/38 |
| 9,028,381 | B2 | * | 5/2015 | Mestemaker | 482/129 |
| 2002/0190177 | A1 | * | 12/2002 | Nielsen | 248/339 |
| 2009/0137368 | A1 | * | 5/2009 | Parrilla | 482/104 |
| 2014/0187391 | A1 | * | 7/2014 | Kelly | 482/104 |

* cited by examiner

*Primary Examiner* — Steven Marsh
(74) *Attorney, Agent, or Firm* — Egbert Law Offices, PLLC

(57) ABSTRACT

A hanging stand for a barbell is provided. The stand has two pole stands and two adjustable holding seats. The two pole stands are longitudinally spaced, and the top of each pole stand has a hook hanging component which can be hanged on a cross rack to enable the pole stands to hang longitudinally. There are four sides of each pole stand, and at least two linked sides have positioning holes which are spaced at intervals. Each adjustable holding seat has a positioning plunger which is capable of being inserted into any of the positioning holes, and provides the body of the barbell to be placed on a holding sheet having an anti-run limitation edge at the end thereof. The hanging stand is easy to construct, flexible to set up, provided at a reduced cost, and the height of barbell is adjustable and progressive.

4 Claims, 7 Drawing Sheets

HANGING STAND FOR A BARBELL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a stand for a barbell and more particularly to an innovative one which is designed with a hanging stand for a barbell.

2. Description of Related Art including Information Disclosed under 37 CFR 1.97 and 37 CFR 1.98

A barbell is a piece of weight lifting training equipment, and it is mainly structured by a barbell body and the weights assembled at the two ends of saying barbell body, and mostly used for snatch, clean and jerk, squat, bench press, deadlift and so on. As for a bench press, it usually requires the barbell athwart put on a stand with a proper height to adapt to the required movements. Therefore, a pole stand for a barbell is an irreplaceable assistive device.

Common stands for barbells are usually fixed with a part of the weight lifting device or standing on the ground. However, these common stands for barbells are space and cost consuming, limitation of locations and lack of flexibility. As a result, weight lifting hobbyists are impeded to purchase because of the lack of budgets and restriction of using space which is an ignorable problem for the related industry.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The present invention discloses a hanging stand or barbell having inventive unique structural design and technical characteristics. It is mainly based on a hook hanging component, two pole stands with positioning holes, and two adjustable holding seats with a positioning plunger and a holding seat. Compared to the prior art, the primary structure of this invention is assembled by two stand poles and two adjustable holding seats, this is easy structured, the cost and the selling price can be reduced significantly, and as such is affordable for the common consumers. Moreover, said two pole stands are used for hanging, users can use any kind of cross rack in surrounding to be hung plus said pole stands comprise of positioning holes which are spaced at intervals on at least two sides, so that it will not be a limitation of location of the pole stands and more flexible, not space consuming. The technical characteristics of said adjustable holding seat is capable to be abutted and positioned of different height of pole stands, the height of the barbell placed can be adjusted flexibly. Based on the above description, it is known that this invention is easy to construct, flexible to set up, reduces the cost, and the height of barbell is adjustable and progressive.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
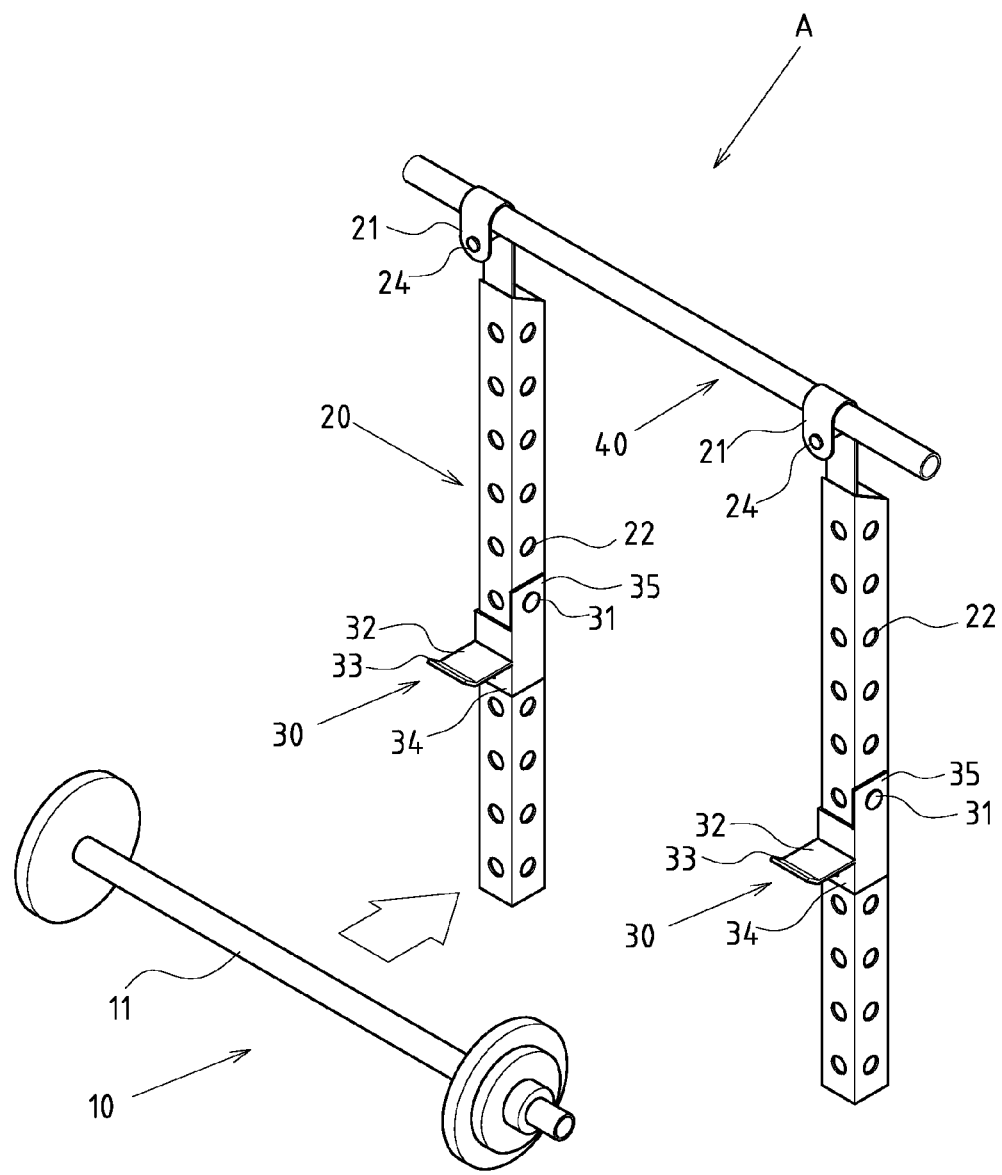
FIG. 1 is a perspective view of the preferred embodiment of the present invention wherein the barbell is not placed on the stand.
Figure 2:
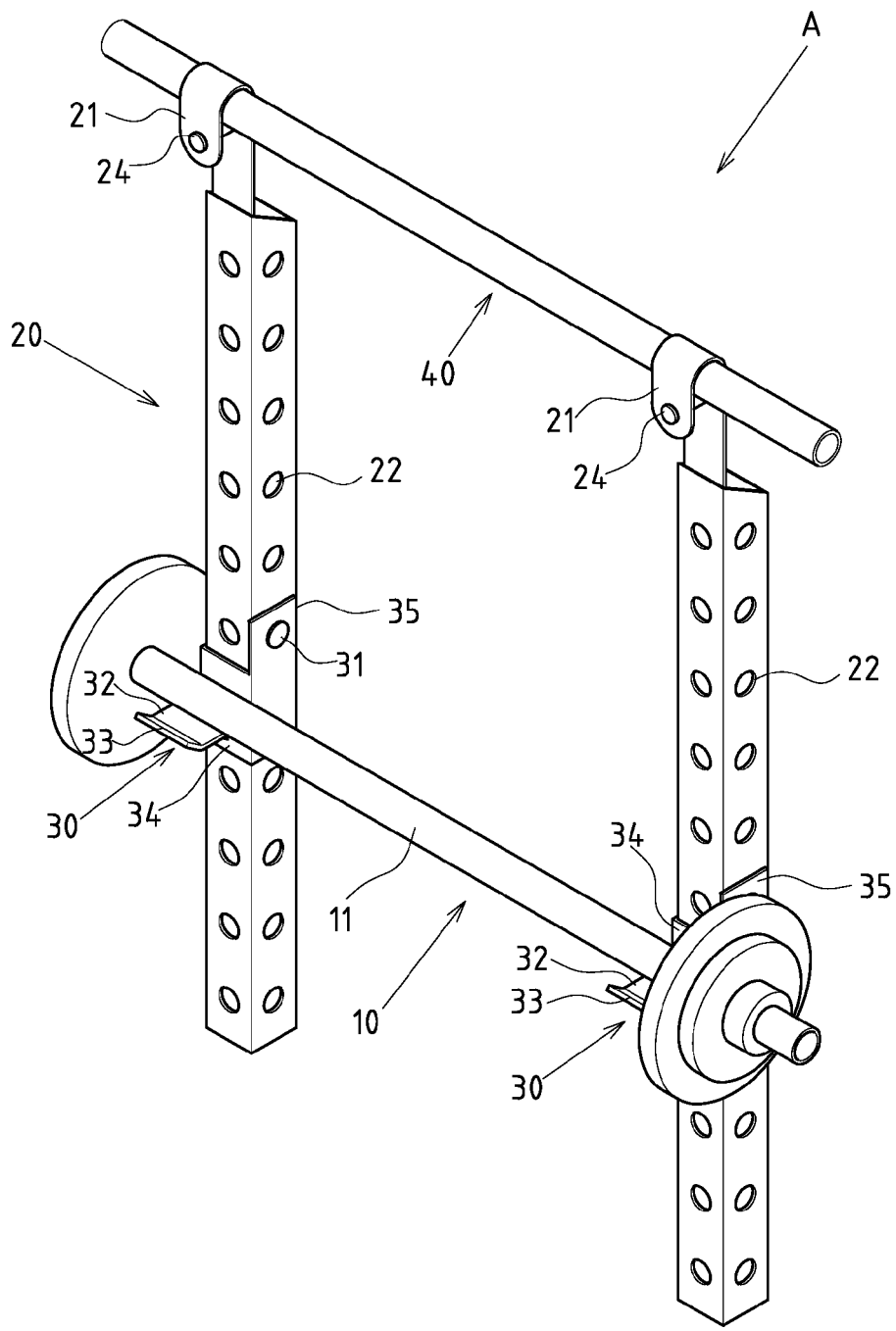
FIG. 2 is a perspective view of the preferred embodiment of the present invention wherein the barbell is placed on the stand.

FIGS. 1, 2, 3, 4 depict preferred embodiments of a hanging stand for barbell of the present invention, which, however, are provided for only explanatory objective for patent claims. Said stand for barbell A is for placing a barbell 10. Said stand for barbell A comprises two pole stands 20 (metal bar is preferred) and two adjustable holding seats 30. Said two pole stands 20 are longitudinal spaced pattern, and the top of each pole stands 20 comprises a hook hanging component which can be hanged on a cross rack 40 to enable the pole stands 20 to hand longitudinally. There are four sides of each pole stand 20, and at least two linked sides have positioning holes 22 which are spaced at intervals (said positioning holes 22 are equally spaced intervals at four sides). Each adjustable holding seat 30 has a positioning plunger which is capable of inserting into any of saying positioning holes 22, and provides the body 11 of the barbell to be placed on a holding sheet 32 comprising an anti-run limitation edge 33 (which is upward obliquely) at the end of saying holding sheet 32.

Figure 3:
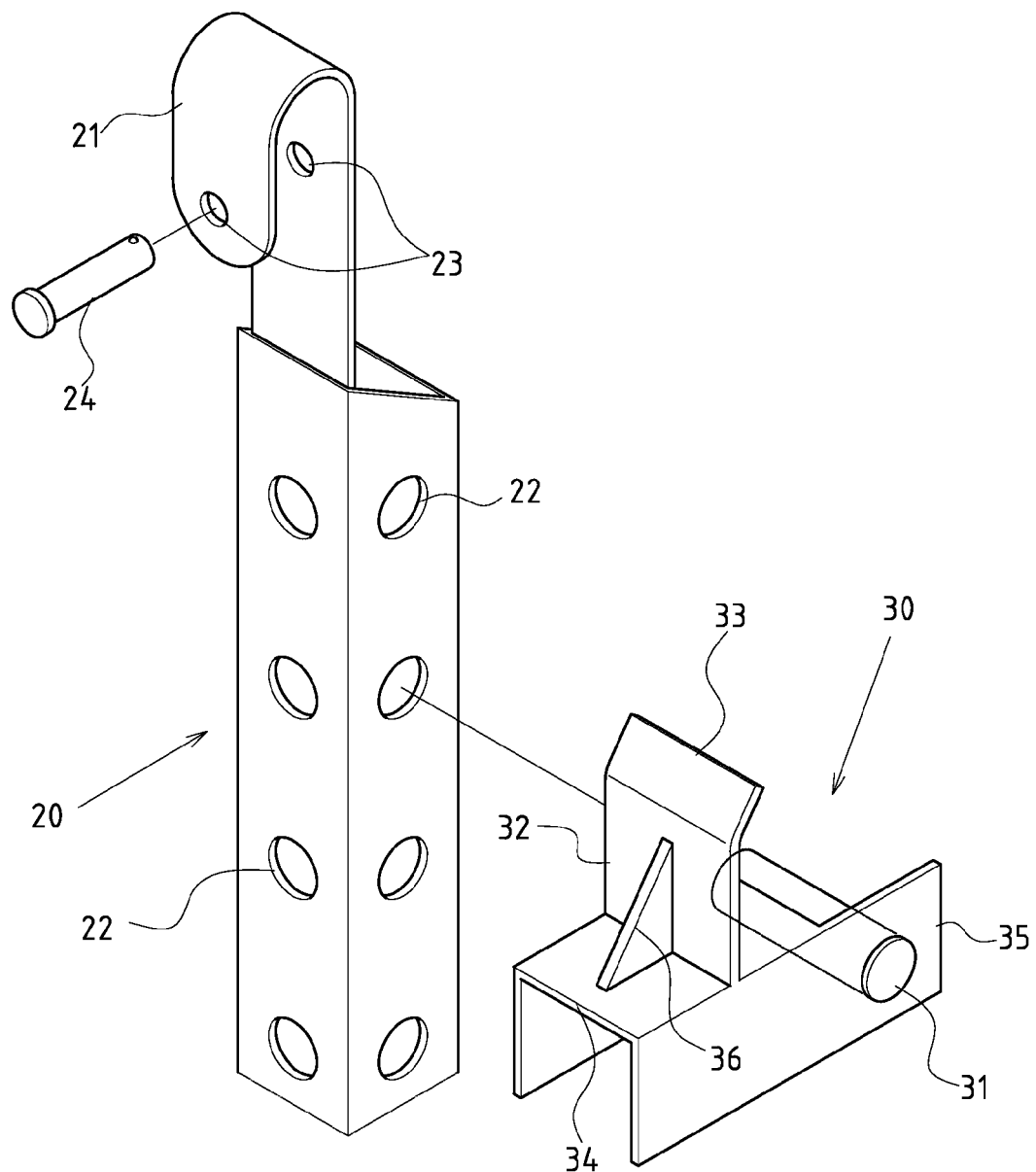
FIG. 3 is an exploded perspective view of the adjustable holding seat and pole stand of the present invention.
Figure 4:
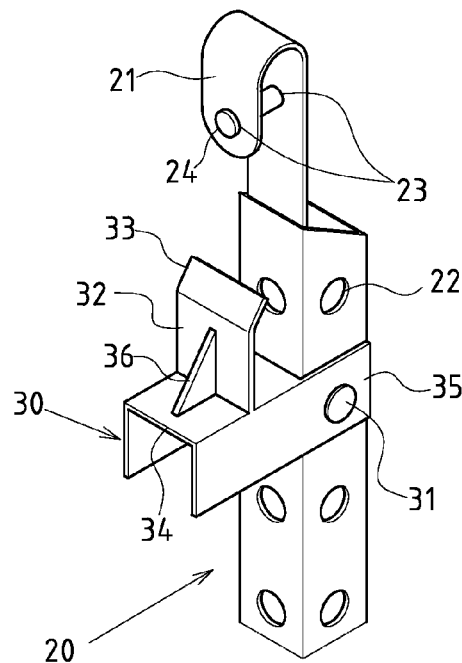
FIG. 4 is an actuating view of the adjustable holding seat abutted against the pole stand of the present invention.
Figure 5:
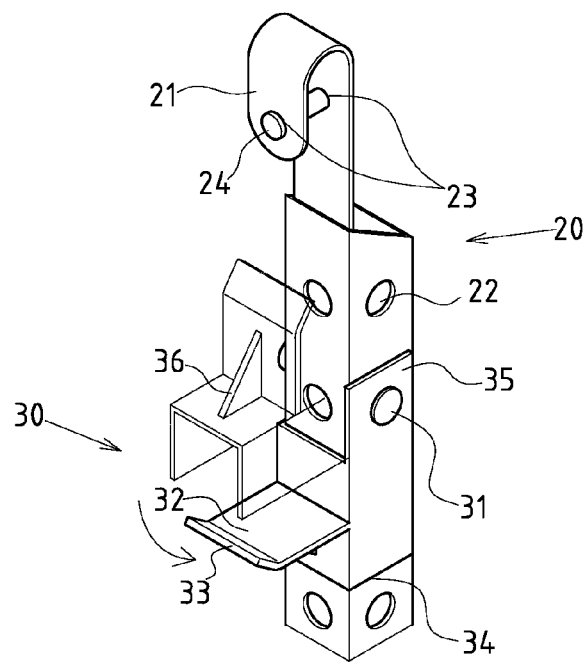
FIG. 5 is an actuating view of the adjustable holding seat abutted against the pole stand of the present invention.
Figure 6:
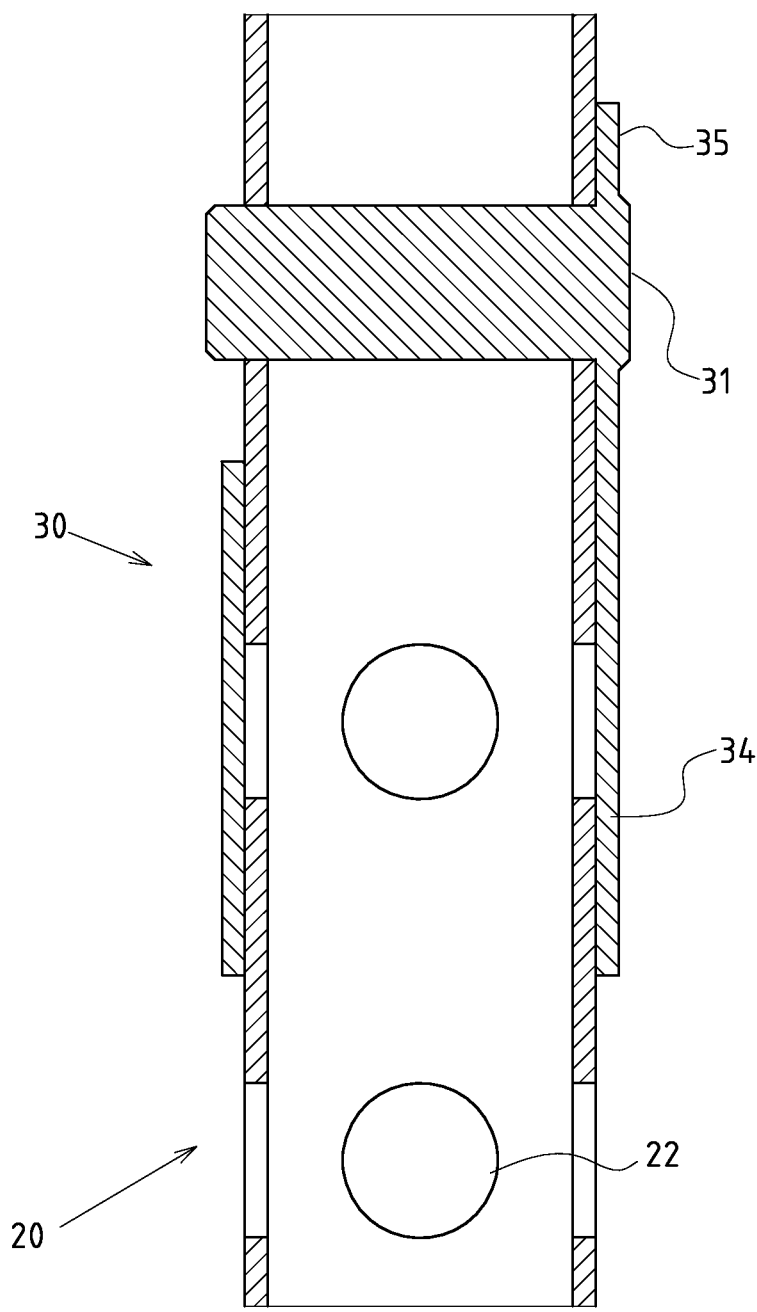
FIG. 6 is a vertical sectional view of the preferred embodiment of the adjustable holding seat and pole stand of the present invention.
Figure 7:
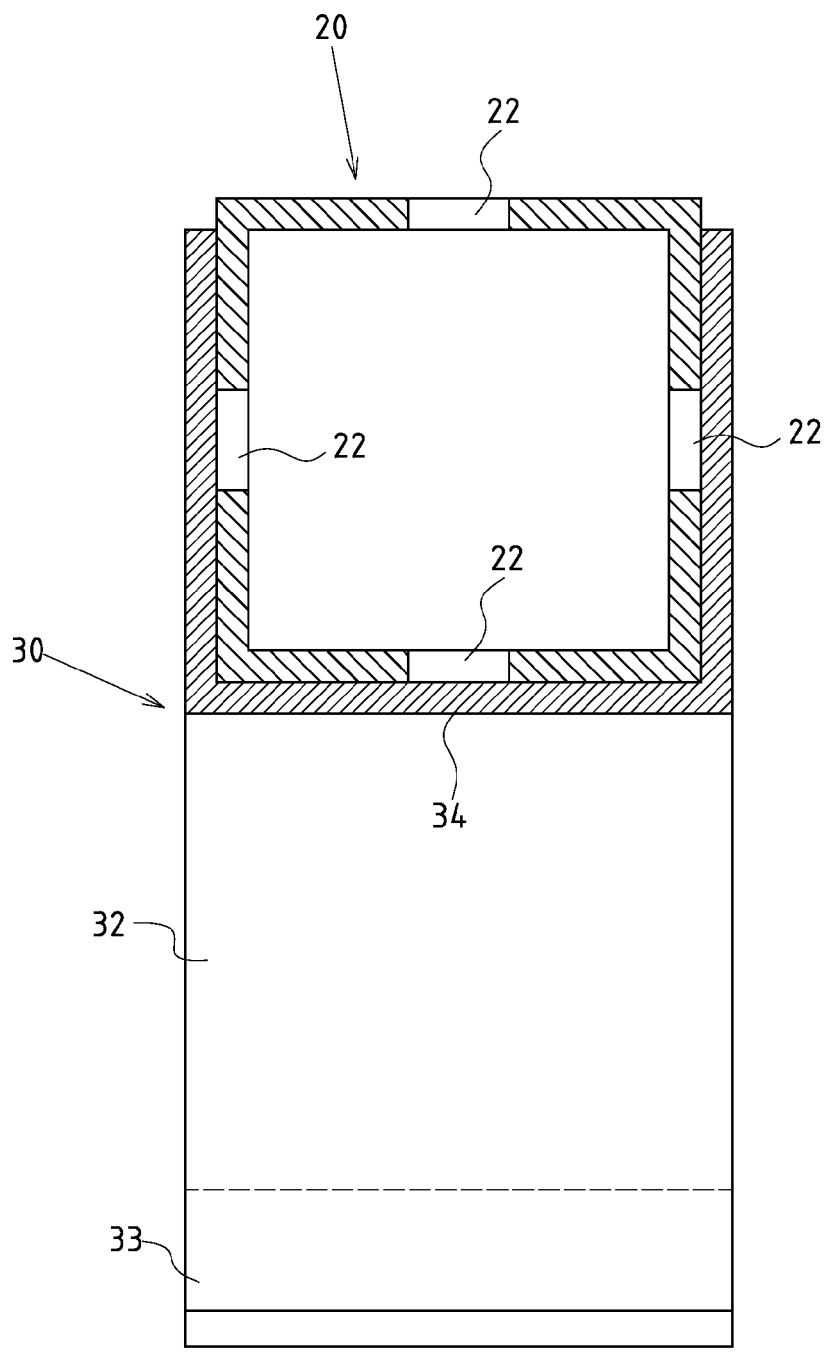
FIG. 7 is a cross sectional view of the preferred embodiment of the adjustable holding seat and pole stand of the present invention.

As FIGS. 3, 6, and 7 show, said adjustable holding seat 30 has a curved frame component 34 is concave and abutted against three sides of pole stands 20, the section of said curve frame component is U shaped to make said holding sheet 32 extend at the front side of saying curve frame component 34, one side of said curve frame component is extended to be formed a extrusion strip 35 which is to make said positioning plunger combined within vertically and to make said positioning plunger 31 and holding sheet 32 aligned. By this design, adjustable holding seats 30 which are assembled with pole stands 20, please see FIGS. 3 and 4. First, said adjustable holding seat 30 should be put in a transverse angle, in the mean time. Positioning plunger 32 is capable to be inserted into the positioning holes 22 of the pole stands 20 in any height. When the positioning plunger 30 is completely inserted into the positioning holes 22, then the curved frame component 34 is capable to be abutted and rotated downward with the pole stands 20 by the users. As a result, this is how to assemble and position the adjustable holding seat 30.

A reinforcement rib is set between the button of said holding sheet 32 and curved frame component.

The tops of said pole stands 20 have a hook hanging component 23 with transverse pin hole 23 to provide the bolt 24 to insert and lock up the hanging status of said hook hanging component 21.

Said pole stand 20 is a metal bar with the sections of rectangles (as FIG. 7 shows), squares, round shapes, and U shapes.

Figure 8:
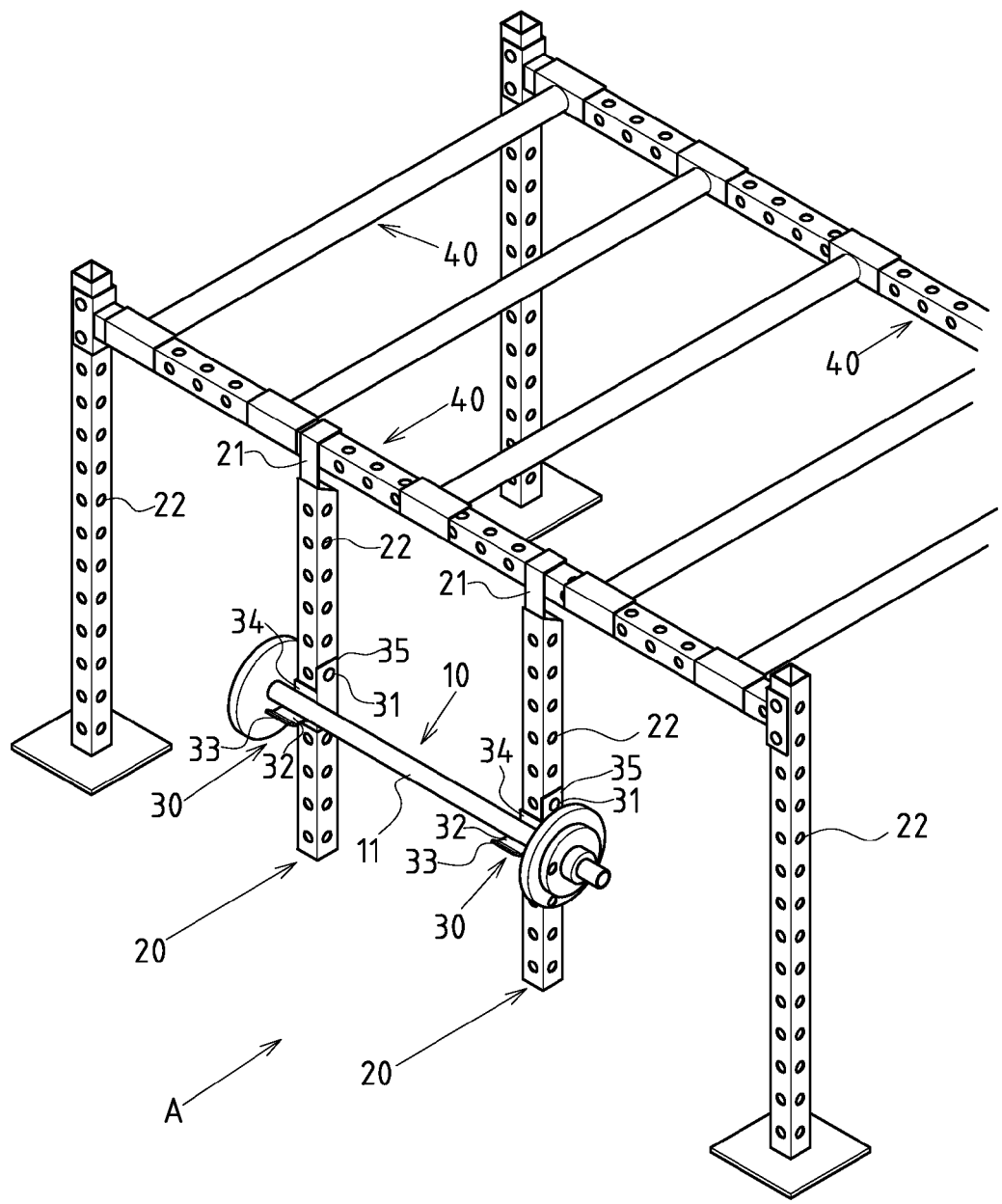
FIG. 8 is an actuating view of the preferred embodiment of the present invention.

According to the said designation, this invention is mainly to provide a hanging stand for a barbell structure which is never seen before, it is actually applied different from those known grounded structures, a hanging stand for barbell A of this invention is set with a hook hanging component comprised on the top of the pole stand 20 hanging on a cross rack 40, and said cross rack can be any kind of cross rack (such as horizontal bars, climbing bars) of frame bodies, like the cross rack 40 in FIG. 8 is a cross rack of the existing climbing bars. Therefore, the hanging stand for a barbell of this invention is provided to be set flexibly.

I claim:

1. A hanging stand assembly for a barbell, the hanging stand assembly comprising;
    a pair of pole stands positioned in spaced parallel relation to each other;
    a pair of hook hanging components respectively affixed to a top of said pair of pole stands, said pair of hook hanging components adapted to hang on a cross rack so as to allow the pair of pole stands to hang vertically, each of said pair of pole stands having four sides arranged in a square or rectangular configuration, at least a pair of linked sides of said four sides having positioning holes formed thereon, said positioning holes being in spaced vertical relation to each other along the sides;
    a pair of adjustable holding seats in which each adjustable holding seat has a positioning plunger received in one of said positioning holes, each of said pair of adjustable holding seats having a planar holding sheet extending in transversely outwardly therefrom and extending a generally horizontal orientation, said holding sheet having an upwardly turned end opposite the pole stand, each adjustable holding seat of said pair of adjustable holding seats having a first side and a second side extending in transverse relation to each other, said first side abutting one side of the pair of linked sides, said second side abutting the other side of the pair of linked sides, said holding sheet extending outwardly of said first side, said second side having length greater than a length of said first side such that said second side has an outwardly extending portion, said positioning plunger affixed to said outwardly extending portion, said positioning plunger positioned in the positioning holes of said other side of the pair of linked sides.

2. The hanging stand assembly of claim 1, the adjustable holding seat having a third side abutting another side of the pole stand, the adjustable holding stand having a generally U-shaped configuration.

3. The hanging stand assembly of claim 1, further comprising:
    a reinforcing rib affixed to a bottom of the holding sheet and affixed to the adjustable holding seat.

4. The hanging stand assembly of claim 1, the hook hanging component having a pin hole extending therethrough, the hanging stand assembly further comprising:
    a bolt extending through said pin hole, said bolt and the hook hanging component adapted to retain and lock the hook hanging component on the cross rack.

\* \* \* \* \*